Sept. 5, 1944.  C. M. KENDRICK ET AL  2,357,333
FLUID PRESSURE DEVICE
Filed March 29, 1941  3 Sheets-Sheet 1

INVENTORS
CHARLES M. KENDRICK
HENRY STEEN
BY
Bartlett Eyre Keel & Weymouth
ATTORNEYS Sept. 5, 1944. C. M. KENDRICK ET AL 2,357,333

FLUID PRESSURE DEVICE

Filed March 29, 1941     3 Sheets-Sheet 2

INVENTORS
CHARLES M. KENDRICK
HENRY STEEN
BY
ATTORNEYS

Sept. 5, 1944.     C. M. KENDRICK ET AL     2,357,333
FLUID PRESSURE DEVICE
Filed March 29, 1941     3 Sheets-Sheet 3

INVENTORS
CHARLES M. KENDRICK
HENRY STEEN
BY
Bartlett Eyre Keel + Weymouth
ATTORNEYS Patented Sept. 5, 1944

2,357,333

UNITED STATES PATENT OFFICE 2,357,333

FLUID PRESSURE DEVICE

Charles M. Kendrick and Henry Steen, New York, N. Y., assignors to Manly Corporation, Washington, D. C., a corporation of Delaware Application March 29, 1941, Serial No. 385,820

24 Claims. (Cl. 121—86)

This invention relates to rotary vane type fluid pressure devices, such, for example, as fluid motors or pumps, and more particularly to fluid pressure devices of this sort in which the rotor is provided with a plurality of vanes arranged to move inward and outward thereof, for example, in a substantially radial direction, during the operation of the device.

Fluid pressure devices of this general class find their widest use at present as hydraulic devices, that is, devices for handling or whose motive fluid is a liquid, such, for example, as oil, and the fluid pressure device of the present invention will be described in connection with such use. It will be understood, however, that the invention is applicable to fluid pressure devices operating with elastic fluids although it is particularly directed toward the provision of a practical, useful device suited for use as an hydraulic device for use in connection with relatively high working pressures, such for example, as 1,000 lbs. per sq. in.

Vane type fluid pressure devices of this character include a rotor having a plurality of vanes movable inward and outward thereof, for example in a substantially radial direction, and are provided with a vane track which is adapted to contact the exposed ends of the vanes and to control the inward and outward movement of the vanes. This vane track may comprise a vane track ring where the fluid pressure device is of constant capacity per revolution of its rotor or may comprise adjustable track members (such, for example, as shown in Patents No. 2,313,075, No. 2,313,246 or in co-pending application filed November 23, 1940, Serial No. 366,931) when the fluid pressure device is of the variable capacity type in which its capacity per revolution of its rotor can be varied. During operation of the device the vane track also cooperates with one or more of the vanes to radially separate the high pressure fluid area on at least one of its circumferential ends, from the adjoining low pressure fluid area. The other circumferential end of the high pressure fluid area is also preferably defined by cooperation between another part of the vane track and one or more of the vanes, although this separation is sometimes effected by cooperation of a part of the vane track and some other member of the rotary assembly, such as the rotor. It is essential that this cooperating contact take place between the fluid separating vane or vanes and vane track and it is also essential that the ends of the vanes be in contact with the vane track as they move onto the portion of the vane track at which such separation occurs. It is also important and practically essential to maintain the exposed ends of the vanes continuously in contact with the vane track in order to obtain smooth, quiet and satisfactory operation of the device.

In fluid pressure devices which are operated as fluid motors or which are employed for other purposes requiring satisfactory operation at relatively low rotative speeds, it is therefore necessary that the vanes be acted upon (at least during the portion of their rotary movement in unison with the rotor in which the outer ends of said vanes move through the fluid intake areas) by a force sufficient to move said vanes outward and maintain their outer ends in contact with the vane track.

Fluid pressure devices employing spring means for urging the vanes radially outward have heretofore been proposed but none of the proposals of which we are aware embodied a practical, useful device meeting commercial requirements, particularly with respect to devices of this character for use with a substantially incompressible liquid, such for example, as oil, as the circulated fluid, and for operation at relatively high pressures of the working pressure fluid, such, for example, as 1000 lbs. per sq. in. or higher pressures.

An object of the present invention is to provide an improved rotary vane type fluid pressure device including an improved arrangement of cooperating elements whereby novel and improved spring means are practically and successfully employed for exerting an outwardly-active force on the vanes.

Another object is to provide an improved fluid pressure device of this character that is capable of use, for example, either as a pump or as a fluid motor, that provides satisfactory operation at low rotative speeds as well as at speeds that are relatively high (such as 1200 R. P. M.), that is suited for operation at relatively low pressures of its working pressure fluid as well as at high pressures thereof such, for example, as 1,000 lbs. per sq. in., that stands up under use for long periods of time and that requires substantially no increase in size or decrease in capacity of the device as compared to the size and capacity of a similar vane type fluid pressure device in which no springs are employed to urge the vanes outward.

A still further object of the invention is to provide a practical fluid pressure device of the character above-mentioned which meets commercial requirements and is suited for use with a substantially incompressible liquid, such, for example, as oil, as the circulated fluid and is also suited for operation at relatively high pressures of the working pressure fluid, such, for example, as 1000 lbs. per sq. in. and higher.

Other and more specific objects will appear from the description which follows.

In one aspect the invention resides not only in the novel features per se but in the new combinations of cooperating elements which together provide the improved and practical device, as more particularly hereinafter set forth.

The invention will be understood from consideration of the accompanying drawings which illustrate, by way of example, the invention embodied in a fluid pressure device employed as a fluid motor of constant capacity per revolution. It will be understood, however, that the invention is likewise applicable to fluid motors of variable capacity and to other fluid pressure devices such, for example, as vane type pumps of either constant or variable capacity.

In the accompanying drawings:

Figs. 10 and 11 are likewise enlarged fragmentary views, partly in section, illustrating another modified form of the vane spring, in which Fig. 10 corresponds generally to Fig. 6 and Fig. 11 shows the vane near its extreme radially inward position with the vane spring correspondingly compressed;

Figure 1:
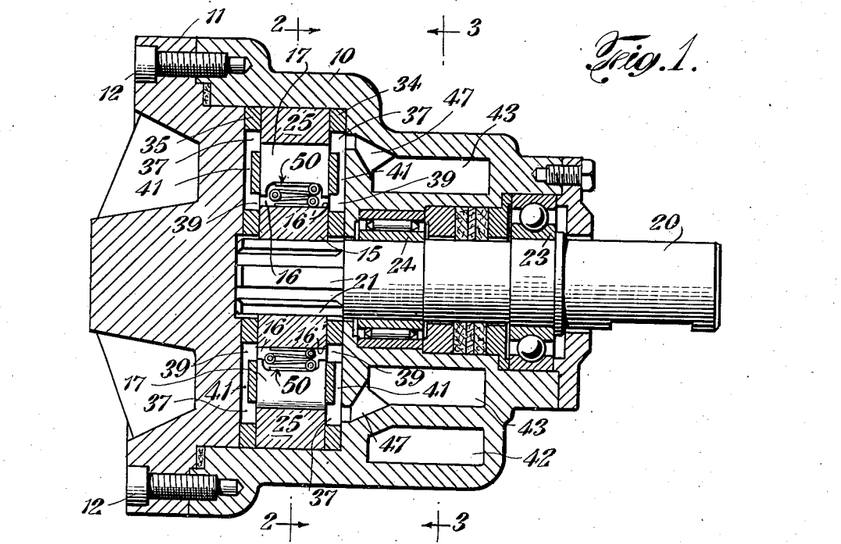
Fig. 1 is a longitudinal sectional view of an illustrative embodiment of the present invention taken along the line 1—1 of Figs. 2 and 3.
Figure 2:
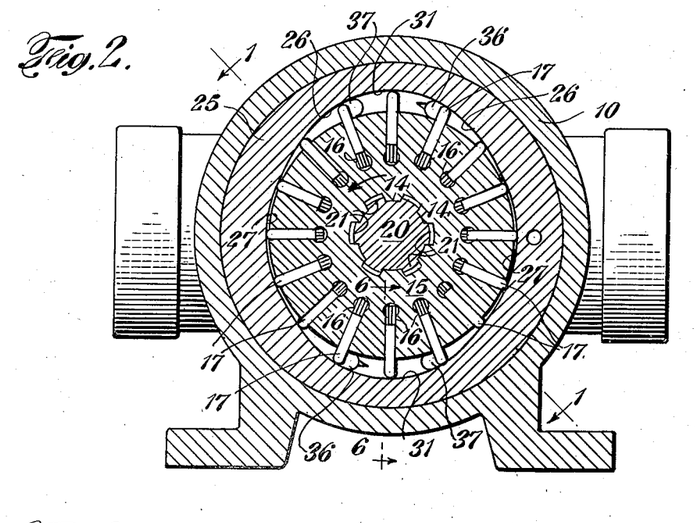
Fig. 2 is a view in vertical transverse section taken along the line 2—2 of Fig. 1.

Referring now to the drawings, the motor includes a casing 10 formed with an open-ended cavity for the rotor 15 and associated parts as shown in Figs. 1 and 2. The rotor cavity is closed (Fig. 1) by an end head or cover member 11 which is attached to the casing 10 as by cap screws 12. The diameter of the rotor 15 illustrated is greater than the width or axial dimension thereof as may be observed in Figs. 1 and 2. The rotor is provided with a plurality of substantially radial vane slots 16 which extend from the periphery of said rotor to a point intermediate the center thereof and in each of which is a vane 17, to be more fully described presently, movable inward and outward therein. A vane track ring 25 surrounds the rotor and vane assembly and its inner circumferential surface 26 (Fig. 2) forms a track adapted to contact the radially outer ends of the vanes 17 as the rotor revolves and to guide and control the vanes in their inward and outward movement; the surface 26 will hereinafter be referred to as the "vane track."

The rotor 15 and driven shaft 20 may be mounted and the two parts may be operatively connected with each other in any appropriate way. In the present instance the rotor 15, shaft 20, their mountings and the operative connections therebetween are the same as disclosed in copending application filed December 8, 1939, Serial Number 307,755, now Patent No 2,335,284. As shown in Fig. 1, the shaft 20 is revolubly supported by a pair of bearing elements 23 and 24 carried by the casing 10 and the rotor 15 is mounted on the end of the shaft 20 which projects into the rotor cavity. For this purpose the end of the shaft 20 is formed with axially extending splines 21 (Figs. 1 and 2) and the rotor 15 is formed in its central opening with mating splines 14 (Fig. 2). The arrangement is such that the rotor 15 is freely movable in an axial direction on the shaft splines 21 while permitting a limited tilting or rocking motion of the rotor 15 relative to the shaft 20 in such manner that the cheek plates 34 and 35, to be presently described, determine the axial and angular positions of the rotor on the shaft and the plane of rotation of the rotor as fully explained in Patent No. 2,335,284 above mentioned.

The rotor 15 is hydraulically balanced with respect to all forces imposed thereon by pressure fluid in the embodiment illustrated. Balance of hydraulic forces acting on the rotor in a radial direction is obtained by dividing the space intermediate the periphery of the rotor 15 and the vane track 26 into two equal and oppositely positioned fluid sections, each fluid section comprising a working or pumping chamber flanked by an inlet and an outlet area. As shown in Fig. 2, the division between the two fluid sections is effected by cooperation of the rotor 15 and the outer ends of the vanes 17 with the vane track 26 at the regions of the vane track's least diameter which in the present embodiment is adjacent the horizontal centerline. In the particular embodiment shown the vane track 26 is provided at each of these points of division with an arc 27, for convenience termed the "sealing arc," substantially concentric with the rotor 15, although not necessarily so, and extending in a circumferential direction for a distance equal to at least the angular distance between a pair of adjacent vanes 17.

The working or pumping chambers of the two fluid sections are formed by means of two diametrically positioned arcs 31 (Fig. 2), preferably concentric with the rotor 15 and termed the "working arcs" or "pumping arcs," which are located in the regions of greatest diameter of the vane track 26. Operating pressure fluid is admitted between the outer ends of the vanes as they move through the inlet areas toward the working chambers and fluid is discharged as the vanes recede therefrom through the outlet areas of the two fluid sections. The inlet area of each fluid section is thus at all times separated from the outlet area of that fluid section by at least one of the vanes 17 and the difference in pressures on the opposite sides or faces of such vanes causes rotation of the rotor 15 of the motor. The portions of the vane track 26 intermediate the sealing arcs 27 and working arcs 31 may be given any suitable curvature producing satisfactory rates of inward and outward movement of the vanes 17 as the rotor 15 revolves.

A pair of mating disc-shaped members 34 and 35 (Figs. 1, 2 and 4), for convenience termed "end plates" or "cheek plates", are disposed on the sides or axial ends of the rotor 15 and are provided with holes at their centers for the shaft 20. The cheek plates 34 and 35 perform several functions, one of which is that they close the sides or axial ends of the working chambers; they also contain the ports for the admission of fluid to an exhaust of fluid from the inner and outer ends of the vanes 17, as will be more fully explained presently. The outer surfaces of the cheek plates 34 and 35 fit snugly against the wall surfaces of the casing 10 and end head 11 respectively and form substantially fluid tight fits with the ports and passages in the casing 10. The inner or opposing faces of the cheek plates 34 and 35 form fluid tight fits with the sides of the vane track ring 25 by which they are axially positioned with respect to the rotor 15 in such manner that the rotor is permitted to turn freely while its sides and the sides of the vanes 17 form substantially fluid tight running fits with the adjacent faces of the cheek plates 34 and 35. The cheek plates 34 and 35 thus also serve as guiding surfaces for the sides or axial ends of the vanes 17 in their radially inward and outward movement and maintain the vanes in proper axial position with respect to the rotor as the rotor and vane assembly revolves. The cheek plate 34 will hereinafter be referred to as the "casing cheek plate" and the cheek plate 35 will be referred to as the "end head cheek plate."

The cheek plates 34 and 35 are provided with co-extensive ports (Figs. 1 and 4), the ports of one cheek plate being axially opposite the ports of the other cheek plate when the parts are in position in the casing 10 so that all forces exerted upon the rotor 15 and vanes 17 in an axial direction by fluid pressure are thus balanced. The ports in the cheek plates 34 and 35 will be best understood from Fig. 4 which shows an inner elevation or the rotor face of the casing cheek plate 34. Each cheek plate is provided with a pair of diametrically opposed arcuate inlet slots or ports 36 and a similar pair of diametrically opposed ports or slots 37. The ports 36 and 37 of the casing cheek plate 34 are also partially shown in Fig. 2 and the ports 37 are also shown in the sectional view of Fig. 1. Operating pressure fluid is admitted to the outer ends of the vanes 17 through the pair of inlet ports 36 in the casing cheek plate 34, and similarly, fluid discharged or exhausted by the outer ends of the vanes 17 passes out through the pair of outlet ports 37 of the same cheek plate. The ports 36 and 37 of the end head cheek plate function principally as "balance ports" to contain fluid under the same pressure as that in the corresponding ports of the casing cheek plate 34 in order to produce balance of hydraulic forces acting upon the rotating parts, as already stated. Fluid may, however, also be admitted to and discharged from the inner ends of the vanes 17 through the ports 36 and 37 respectively of the end head cheek plate 35 as will be understood from the explanation which follows.

Each of the cheek plates 34 and 35 is also provided with two pairs of arcuate recesses or vane slot ports 38 and 39 which are positioned to register successively with the inner ends of the vane slots 16 as the rotor revolves. The vane slot ports 38 are connected with the inlet ports 36 by radial grooves or passages 40 on the outer faces of the cheek plates 34 and 35, as shown by the dotted lines of Fig. 4; the vane slot ports 39 are similarly connected with the outlet ports 37 by the radial grooves or passages 41 as shown by the dotted lines of Fig. 4 and by the full lines in the sectional view of Fig. 1. The arrangement is such that the inner ends of the vane slots 16 are connected with fluid under the same pressure as that of the fluid acting upon the outer ends of their corresponding vanes 17 while said vanes are passing between the sealing arcs 27 and the working arcs 31, and vice versa, and hence the vanes 17 are substantially in hydraulic balance when they are moving radially while passing along the intermediate portions of the vane track 26. The vanes 17 are thus substantially free to move radially inward and outward as they pass intermediate the sealing arcs 27 and working arcs 31, so that vanes whose outer ends are passing through the inlet areas may be moved outward and kept in contact with the vane track by application of a force which is relatively small but is sufficient to shear the oil film, overcome friction, etc. and impart to each vane the required acceleration in a radially outward direction. In a vane type fluid pressure device of this character it is essential that the combined forces acting to urge each vane outward shall exceed the opposing force or forces acting to urge the vane inward during at least the portion of the rotary travel of the vane in which such vane must be moved outward in order to maintain its outer end in contact with the vane track. In most instances in which vane springs are employed to effect outward movement of the vanes, and particularly when the working pressure of the fluid is relatively high, this relation of forces acting to urge the vane inward and outward respectively is best obtained by maintaining at the inner ends of the vanes fluid pressure at least substantially equal to the pressure of the fluid simultaneously acting on the outer ends thereof during the time that said outer ends are moving through the inlet area or areas of the fluid pressure device; the importance of this will be more fully pointed out and explained presently.

The vane slot ports 38 are here shown as made of such length that they also connect with the inner ends of those vane slots 16 whose vanes 17 are in contact with the sealing arcs 27 and working arcs 31 so that fluid from the inlet ports 36, which are the high pressure ports of the fluid motor, is supplied to the inner ends of such vanes to assist in holding their outer ends firmly in contact with the vane track surfaces at these points.

Figure 3:
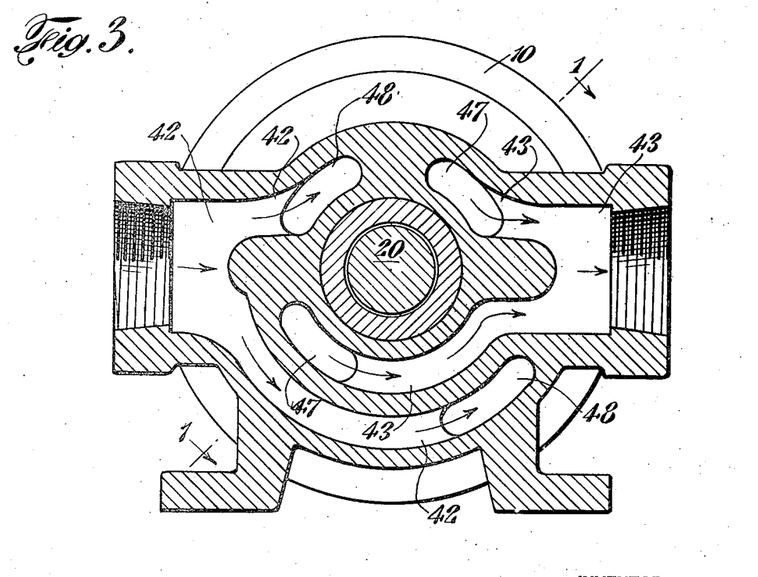
Fig. 3 is also a vertical transverse sectional view but is taken along the line 3—3 of Fig. 1, looking in a direction opposite to that of Fig. 2.

The fluid circuit also includes a branched fluid inlet channel 42 and a branched fluid outlet channel 43 which are formed in the casing 10 (Figs. 1 and 3). The fluid outlet channel 43 is connected with the outlet ports 37 of the casing cheek plate 34 as by slanted passages 47 (Figs. 1 and 3) and the fluid inlet channel 42 is connected with the two inlet ports 36 of said casing cheek plate 34 as by slanted passages 48 (Fig. 3) similar to the slanted passages 47. Working pressure fluid for operation of the motor is supplied through the inlet channel 42 by any suitable source, not shown, and fluid discharged by the vanes 17 as they rotate in unison with the rotor passes out through the outlet channel 43.

With the arrangement hereinbefore described and with the parts in the positions shown in Figs. 1 and 2, working pressure fluid admitted to the inlet channel 42 will pass into the inlet ports 36 of the casing cheek plate 34 and the fluid inlet areas connected therewith; working pressure fluid acting on the adjacent faces of the vanes 17 that are then in contact with the working arcs 31 will cause rotation of the rotor and vane assembly and the shaft 20 in a counterclockwise direction as viewed in Fig. 2. In order for this operation to take place, however, it is necessary that the outer ends of the vanes 17 be in contact with the vane track 26 as said vanes approach the working arcs 31. As previously stated, it is also important and practically essential for quiet and satisfactory operation that contact between the outer ends of the vanes 17 and the vane track 26 be maintained throughout the movement of said vanes through the fluid inlet areas, as sudden and abrupt outward movement of the vanes would otherwise result and would produce noise, wear and unsatisfactory operation. This contact of the vanes 17 with the vane track as they approach the working arcs 31 and the track-following action of the vanes as they pass through the fluid inlet areas will not dependably result, however, unless the vanes 17 are acted upon by an adequate radially outward force. According to the present invention this radially outward force is produced by improved means, including novel and improved vane springs, which will be described after briefly considering some of the limitations and requirements obtaining.

One of the limitations is the very small amount of space available to accommodate each vane spring, which space limits and determines the maximum permissible size of the vane spring. For example, in one popular size of fluid pressure device in which no vane springs are used, the vane slots extend about ¾" radially into the rotor body, the rotor body is about 1" wide and the parallel opposing walls of each vane slot are spaced from one another a small distance such as $^5/_{64}$" to ⅛", so that the approximate dimensions of each vane slot is about ¾" x 1" x ⅛", or less. When vane springs are used this slot must accommodate both the vane and its vane spring because increase in dimensions of the vane slot to provide more space for the vane spring would in most instances require increase in the dimensions of the rotor and associated parts which is undesirable from the standpoint of size, weight, cost, operating and other considerations.

It is thus seen that the space available to accommodate each vane spring is very small, particularly when the vane is in its extreme inward position, and while the vane spring must be correspondingly small it must be capable of meeting severe operating requirements as has been broadly indicated previously. For example, each vane spring must be capable of relatively great deflection, particularly in comparison with its size. This deflection is due to the length of "stroke" (i. e., the amount of inward and outward movement of the vane relative to the rotor) generally used and preferred for best efficiency; for example, the stroke of the vanes is usually from about $^1/_{16}$" to about $^1/_8$" in the fluid pressure device having the above mentioned vane slots. Moreover, the vane spring must be capable of performing its intended function (i. e., moving the vane radially outward to keep its outer end in contact with the vane track as the vane passes through the inlet areas) when the compression of the vane spring is least, that is to say, as the vane approaches its extreme radially outward positions adjacent the working arcs 31; in fact, satisfactory functioning of the vane spring at these regions is absolutely essential as the outer end of the vane must be in contact with the vane track as it moves onto the working arcs 31 in order to provide satisfactory operation of the fluid pressure device.

From the foregoing it will be understood that because of its small size as indicated by the space available to accommodate it, each vane spring can exert only a relatively small force on its corresponding vane, particularly at the more critical points near its positions of least compression at which its functioning is of prime importance. In fact, the force that can be exerted by a vane spring meeting the operating requirements herein set forth is so small that said vane spring can perform its intended function (i. e., moving the vane outward during intake to keep its outer end in contact with the vane track) only when resistance to radial movement of the corresponding vane is reduced to substantially the minimum, so that the work to be done by the vane spring consists merely of shearing the oil film, overcoming friction when the hydraulic forces acting on the vane are substantially balanced and imparting to the vane the necessary acceleration in its radial direction of movement. The importance of the previously stated relation as to relative pressures at the inner and outer ends of the vane during intake (i. e., that the pressure at the inner end of the vane shall be at least substantially equal to the pressure at the outer end thereof during the time of its radially outward movement) thus becomes clear and the manner and extent to which it co-operates and contributes to a successful fluid pressure device of this character is also seen. It should also be noted, however, that substantial balance of hydraulic forces acting on the outer end of the vane as it passes through the inlet areas also contributes toward its freedom of radial movement and is of importance for this reason. Balance of hydraulic forces acting on the rotor and vanes in an axial direction, i. e. on the sides or axial ends of the rotor and vanes, which is provided by the mating slots in the cheek plates 34 and 35, as above explained, is also important as unbalance of these forces would tend to force the vanes against one or the other of these cheek plates and thus present resistance to inward and outward movement of the vanes in the vane slots.

Still another operating requirement of the vane spring grows out of the extremely large number of flexings required of each vane spring during the life of the device and the rapidity with which such flexings often occur. For example, in a fluid pressure device having two fluid sections as illustrated herein, each vane spring must flex twice for each revolution of the rotor; at 1200 R. P. M., which is a speed often used commercially, each vane spring must therefore flex 2400 times per minute which is equivalent to 144,000 flexings per hour and to about 1,000,000 flexings in only about 7 hours of operation at this speed, yet the vane spring must be capable of operation for hundreds or thousands of hours at this speed. It is thus seen that the vane spring must be capable of flexing through a relatively wide range of deflection at a relatively high frequency for extended periods or continuous operation but must also have an almost indefinite life, as failure of a vane spring would not only result in noisy and unsatisfactory operation of the fluid pressure device but might also cause stoppage of the device if the broken spring became jammed between the moving parts and could also cause cutting and other damage to the parts even though no stoppage occurred.

As an indication of the small space available for the springs the illustrations of the spring seats and springs in Figs. 6 to 15 (i. e., in the scale of the drawings forming part of this application) are enlarged views of the actual vanes and springs exhibited.

Figures 6, 7:
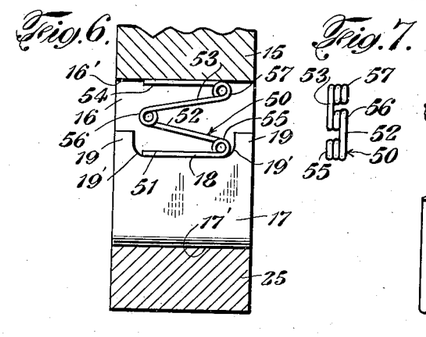
Fig. 6 is an enlarged fragmentary view, partly in section, taken along the line 6—6 of Fig. 2 and showing a face of one of the vanes together with the same vane spring therefor as illustrated in Figs. 1 and 2 but with the vane in or near its extreme radially outward position and with the vane spring correspondingly extended.
Fig. 7 is a side or end view of the vane spring illustrated in Fig. 6 as viewed from the right, drawn to substantially the same scale as that of Fig. 6 and with the vane spring compressed to the same extent as shown in Fig. 6.

A preferred embodiment of a novel and improved vane spring successfully meeting these severe requirements is illustrated in Figs. 1, 6 and 7 and will now be described.

Referring to these figures, each vane spring 50 is of a novel and improved form of compound torsion-type spring, each comprising (Fig. 6) two substantially parallel arm or bar portions 51 and 54 respectively and two arm portions 52 and 53 respectively angularly disposed with respect to the arm portions 51 and 54 and with respect to each other. The contiguous ends of the respective arm portions are joined by coiled portions 55, 56 and 57 respectively, each preferably consisting of a plurality of coils, as best shown in Fig. 7; in order that the stress incident to deflection of the vane spring 50 may be kept within desired limits. The arrangement is also preferably such that the coiled portions 55, 56 and 57 are substantially in alinement with each other as shown in Fig. 7, so that the outer coils of each of the three coiled portions lie in substantially the same planes. This may be accomplished in the forming of the vane springs and has several advantages among which is that each vane spring occupies a very small space when fully deflected without subjecting parts thereof to any appreciable alining forces that increase the stress. The arrangement also reduces the tendency of the parts of the vane spring to move out of line with one another as the spring is flexed, thus reducing the friction and wear between parts of the vane spring and the parallel opposing wall surfaces of the vane slot 16. The proportions of the parts are also preferably made such that the coiled portion 56 comes within the recess at the inner end of the vane 17 and clears the adjacent inwardly projecting portion 19 thereof when said vane 17 is in its extreme inward position and the vane spring 50 is fully compressed. The vane springs 50 may be made of any suitable material but materials having relatively high tensile strength, such, for example, as music wire, are preferred.

According to the present invention the vane springs are maintained in operating position by an arrangement that induces very little, if any, localized stresses in said vane springs as they flex in unison with the inward and outward movements of the vanes; this is of great importance as such localized stresses could cause, and frequently would cause, failure of the vane springs and unsatisfactory operation of the device. The mounting and locating means for the vane springs are preferably made such that the vane springs are loosely disposed in the vane slots (that is to say, they are without definite attachment to the vanes, the rotor or any other part of the device) and the arrangement is also preferably such that limited self-locating or adjusting movement of the vane springs is permitted in order that said vane springs may find and maintain their own operating positions. In the particular embodiments illustrated the foregoing are accomplished by a very simple arrangement which has proved entirely satisfactory in extended operation and which will now be described.

Figures 8, 9:
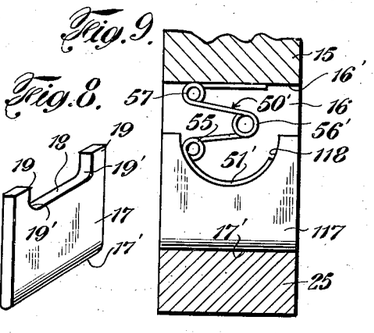
Fig. 8 is a perspective view of the vane shown in Figs. 1, 2 and 6, drawn to substantially the same scale as that of Fig. 6.
Fig. 9 is a view corresponding generally to Fig. 6 but showing a modification of the vane and the vane spring.

Each vane spring is maintained in operating position by means of a recessed seat into which one of the ends of the corresponding vane spring is received and in the particular embodiments shown this seat is carried by the vane. For example, as best shown in Fig. 8, the radially inner end of each vane 17 is cut away to form a recessed seat 18 for its corresponding vane spring 50. The seat 18 conveniently extends through the entire thickness of the vane and in the embodiment illustrated in Figs. 1, 6 and 8 said seat 18 is substantially straight, flat and parallel with the outer end 17' of the vane 17 and is so arranged that a side portion 19 of the vane extends radially inward beyond said seat 18 when the vane 17 is in position in the rotor 15. The depth of the recess (i. e., the distance from the radially inner end of the vane 17 to the seat 18) may vary but is preferably kept small and, as illustrated, comprises a relatively small part of the vane's radial dimension; this is desirable in order to preserve the fluid seal intermediate the seat 18 and the periphery of the rotor 15, this seal being formed by the opposing wall surfaces of the vane slot 16 and the faces of the vane 17 and being of importance to prevent leakage from the vane slot ports 38 during the time that the outer end of each vane 17 moves across the working and sealing arcs. The relatively shallow depth of this recess further indicates the very small amount of space available to accommodate each vane spring as already discussed. The arm portion 51 and coiled portion 55 of each vane spring 50 are disposed in the recess at the radially inner end of the corresponding vane 17 and parts thereof loosely engage and bear against the seat 18 which, together with the inwardly projecting portion 19, keep the vane spring in operating position in its vane slot. The ends of the seat 18 preferably terminate in curved portions 18' which extend onto the contiguous surfaces of the inwardly projecting portions 19 of the vane, these curved portions 18' preferably having a radius equal to or greater than that of the coiled portion 55 of the vane spring; this construction tends to assist the vane spring 50 in finding its proper operating position and is also of advantage from the standpoint of strength of the vane. The arrangement is also preferably such that the combined longitudinal dimensions of the arm 51 and coiled portion 55 of the vane spring are slightly less than that of the recessed seat 18 in order to permit but limit self-locating or adjusting movement of the vane spring in a generally longitudinal direction, so that said vane spring 50 may be free to adjust itself to find its own operating position and to assure that said arm portion 51 and said coiled portion 55 will be substantially free of stress other than that incident to flexing of the vane spring 50.

Each vane spring 50 is thus loosely mounted in its vane slot 16 and is maintained in substantially self-located operating position without any definite attachment or the like which induces any material localized stress in said vane spring upon flexing of the same, and this is accomplished by simple retaining means disposed entirely within the corresponding vane slot 16. Moreover the vane spring 50 is kept out of contact with the opposing inner wall surfaces of the cheek plates 34 and 35, so that its only contacts are with the wall surfaces and inner end of the vane slot 16 and with the corresponding vane 17; this is important, as contact of the vane springs with the wall surfaces of the cheek plates would not only add friction and wear but may also cause cutting of the cheek plates, particularly if any portion of the vane spring enters any of the ports 36 and 37 or the vane slot ports 38 and 39.

As already stated, the arm portion 51 and the coiled portion 55 of each vane spring continuously bear against the recessed seat 18 of the corresponding vane 17. Similarly, the arm portion 54 and the coiled portion 57 of the vane spring are arranged to loosely engage and continuously bear against the inner end or wall 16' of the corresponding vane slot 16. The arm portions 51 and 54 are thus substantially parallel with each other when the parts are in position in the motor and they remain in this parallel relation throughout deflection of the vane spring 50 as the corresponding vane 17 moves radially inward and outward. There is thus a substantially unchanging contact relation between the coiled portion 55 and the arm portion 51 with respect to the seat 18 and likewise a substantially unchanging contact relation between the coiled portion 57 and the arm portion 54 with respect to the inner end 16' of its vane slot 16. Further, there is also a substantially unchanging positional relation between the arm portion 51 and the coiled portion 55, and, similarly, between the arm portion 54 and the coiled portion 57. These contact and positional relations assist in keeping the vane spring free from substantial localized stress.

The arrangement and construction of the vane spring 50 has a number of advantages. For example, it is a compound torsion-type spring, that is to say, it comprises at least two coiled portions which are active in torsion as the spring flexes and which are separated from one another by an arm portion. All three of the coiled portions 55, 56 and 57 of the vane spring 50 are active in torsion as the spring is flexed and there is a relatively small difference between the force exerted by said vane spring on the vane 17 when the vane is in its extreme outward position as compared with the force exerted by said spring on said vane when said vane is in its extreme inward position; the needed outward force is thus provided at all positions of the vane but without materially excess force, which could induce high stress in the vane spring 50 when the vane is in its extreme inward position. Another advantage is that there is little or no longitudinal movement of the arm portion 51 and coiled portion 55 and of the arm portion 54 and coiled portion 57 in their contacts with the seat 18 of the vane 17 and with the inner end 16' of the vane slot 16 respectively as the vane spring is flexed incident to the inward and outward movement of the vane, with consequent little or no wear and friction at these points. A still further advantage is that the vane spring 50 exerts little or no end thrust on the corresponding vane 17 in a direction tending to move it against one of the cheek plates 34 or 35.

The vane type fluid motor hereinbefore described has many advantages, some of which have been indicated. It is simple and inexpensive yet provides dependable operation for long periods. Its operation is controlled by regulating, in any suitable manner, the volume of working pressure fluid admitted to its fluid inlet channel 42 and it will start smoothly and promptly when working pressure fluid is admitted to said channel 42. It operates quietly and steadily at speeds ranging from those which are very low to those which are relatively high, such, for example, as 1200 R. P. M. and at working pressures up to relatively high working pressures, such, for example, as 1,000 lbs. per sq. in. It is capable of extremely rapid acceleration and deceleration due to the small size and weight of its rotating parts and the complete balance of hydraulic forces acting thereon; in fact, it can be accelerated from zero up to 1200 R. P. M. in a fraction of a second. In short, as demonstrated in actual practice it provides operation that is entirely satisfactory and that is exceptional in certain characteristics. These operating properties are provided not by any single element alone but by the cooperation of the several elements as hereinbefore explained.

The arrangement above described also provides quick and easy assembly. In assembly, the shaft 20, casing cheek plate 34 and rotor 15 are first put in place in the usual manner. The vane and vane spring elements are then put in place; this is accomplished by putting the arm 51 and coiled portion 55 into place in the recessed end of the corresponding vane 17 and inserting both of them together into the corresponding vane slot 16, the vane spring 50 being compressed with the fingers sufficiently to permit its entry into said vane slot. The vane and vane spring elements can most conveniently be put into place when the corresponding vane slot 16 is opposite one of the working arcs 31, the rotor 15 being rotated as necessary to provide in turn this relative position for each of the vane slots. When inserted in the above manner, the vane springs 50 find and maintain their own proper operating positions without further care or attention. In practice the arm 51 and coiled portion 55 of each vane spring are conveniently made identical with the arm 54 and coiled portion 57 respectively, these portions having been designated with different reference numerals for convenience in description; this arrangement facilitates assembly as no attention need be paid to which of these portions is put into the recessed end of the vane 17 and which of the portions bears against the inner end 16' of the corresponding vane slot 16. The vanes 17 are likewise preferably identical or symmetrical with respect to their two faces, so that either face of any vane may be employed as its leading face or vice versa. It is thus almost impossible to improperly assemble the vane and vane spring elements, which may be done quickly, without great care and with full assurance that the vane spring 50 will find their proper operating positions and give satisfactory results. The ease of assembly provided by this arrangement may also be understood from the fact that it takes only a few minutes to insert the entire set of vanes and vane springs in the vane slots of a fluid motor of the character illustrated.

The vane type fluid motor as hereinbefore described is not reversible, that is to say, working pressure fluid must be supplied only to the fluid inlet channel 42 which causes the rotor 15 to revolve in a counter-clockwise direction as viewed in Fig. 2. The arrangement may be readily modified, however, to provide a reversible vane type fluid motor, capable of operating in either direction of rotation, depending upon whether working pressure fluid is supplied to the channel 42 or the channel 43, either of which may be employed as the inlet channel. By way of example, a modified arrangement for a reversible vane type fluid motor according to the present invention is diagrammatically illustrated in Fig. 5.

Figure 4:
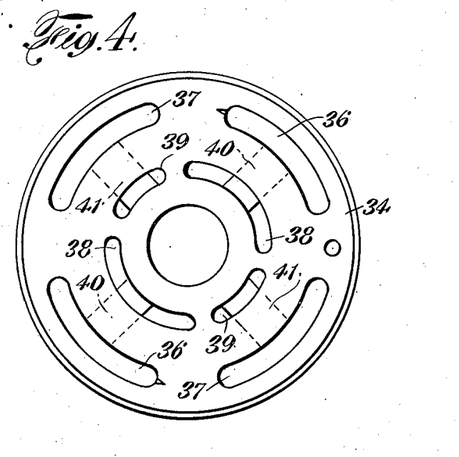
Fig. 4 shows an inner elevation of one of the members, for convenience termed the "casing end plate" or "casing cheek plate"
Figure 5:
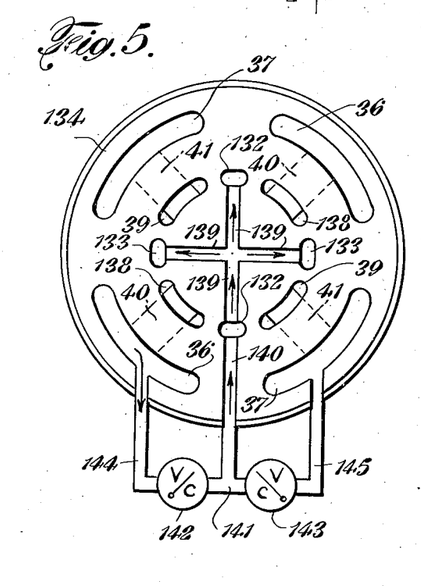
Fig. 5 shows, in somewhat schematic arrangement, an inner elevation of a casing cheek plate modified for use in a reversible vane type fluid pressure device together with a portion of the modified fluid circuit employed therewith.

The modified casing cheek plate 134 of Fig. 5 is provided with a pair of vane slot ports 138 corresponding generally to the vane slot ports 38 of Fig. 4 but arranged to connect with the inner ends of the vanes during only the time that the outer ends thereof are moving intermediate the sealing arcs 27 and working arcs 31 while passing through the fluid areas connected with the ports 36. The vane slot ports 138 are connected with the ports 36 as by grooves or passages 40 on the outer face of the end plate 134 so that the pressure in the ports and vane slot ports is substantially equalized. The modified casing cheek plate 134 also includes a pair of ports 36 and a pair of vane slot ports 38 which are connected on the outer face of said cheek plate 134 by grooves or passages 40, all identical with the similarly designated ports and passages of the cheek plate 34 of Fig. 4.

The rotor face of the casing cheek plate 134 is also formed with two pairs of recessed vane slot ports 132 and 133 respectively which are disposed intermediate the vane slot ports 138 and 39 and are adapted to connect with the inner ends of the vane slots 16 during only the time that the outer ends of the vanes 16 therein are traversing the working arcs 31 and sealing arcs 27 respectively. In the particular embodiment illustrated the two pairs of vane slot ports 132 and 133 are arranged to be supplied with pressure fluid from whichever of the pair of ports 36 or 37 are at the time the inlet or high pressure ports; the ports 132 and 133 are accordingly connected, as by the schematically illustrated passages 139, with a passage 140 leading to a passage 141 and connecting with said passage 141 at a point intermediate its ends. The ends of the passage 141 connect with a pair of one-way check valves 142 and 143 respectively which in turn are connected with the ports 36 and 37 respectively as by the passages 144 and 145. The one-way check valves 142 and 143 are arranged to permit the passage of fluid from the passages 144 or 145 into the passage 140 but prevent the passage of fluid in the opposite direction. With this arrangement, the passages 141, 140 and 139 and the vane slot ports 132 and 133 are at all times supplied with working pressure fluid from whichever of the pair of ports 36 or 37 are at the time the high pressure or inlet ports of the fluid motor. Working pressure fluid is thus provided to assist in holding the vanes 17 in contact with the vane track during the time that the outer ends thereof are traversing the working arcs 31 and sealing arcs 27, and this is true irrespective of whether the ports 36 or the ports 37 are the high pressure or inlet ports. The pressure of the fluid acting on the inner and outer ends of the vanes as they pass intermediate the working and sealing arcs is substantially equalized, and this is also true irrespective of whether the ports 36 or the ports 37 are the inlet or working pressure ports of the motor.

Admission of working pressure fluid to the channel 42, and hence to the ports 36, causes the rotor 15 to revolve in a counter-clockwise direction as viewed in Fig. 2, as previously explained. Admission of working pressure fluid to the channel 43, however, causes the rotor 15 to revolve in a clockwise direction as viewed in Fig. 2. The direction of rotation of the rotor 15 and shaft 20 may thus be reversed by reversing the direction of fluid flow to and from the channels 42 and 43 respectively.

A vane type fluid motor embodying the modified arrangement of Fig. 5 provides equally and entirely satisfactory operation in either direction of rotation of the rotor 15 and is capable of reversal, either slowly and gradually or very rapidly, reversals at the rate of 3600 per hour having been made under inertia load.

The mating or end head cheek plate for use with the modified casing cheek plate 134 is, of course, correspondingly modified to provide an arrangement of its vane slot ports similar to and mating with the vane slot ports 39, 132, 133 and 138 shown in Fig. 5. It is sufficient, however, to provide the check valve arrangement shown in Fig. 5 for only one of the cheek plates (i. e., for the ports 132 and 133 of either the casing cheek plate or the end head cheek plate, but not for both cheek plates) as working pressure fluid is supplied to the ports 132 and 133 of the other cheek plate through the inner ends of the vane slots 16.

Numerous other modifications may be made, as, for instance, in the construction and arrangement of the vane springs. For example, it is not necessary that the three coiled portions of the vane spring 50 have the same diameters. This will be understood from the modified compound torsion-type vane spring 50' illustrated in Fig. 9 in which the coiled portion 56' is shown as having a diameter greater than that of the coiled portions 55 and 57. The use of a larger diameter for the coiled portion 56' does not require additional space for the vane spring as the other coiled portions are not in line therewith, relative to the radial position of the parts, and the larger diameter has the advantage of inducing less stress.

Fig. 9 also illustrates another practical modification, that is to say, the arm portions of the vane spring need not necessarily be substantially straight but may have other shapes, such, for example, as the curved arm 51' shown in Fig. 9. The vane 117 of Fig. 9 is also modified to provide a curved seat 118 against which the arm 51' and coiled portion 55 are adapted to bear and on which they are free to move so that the vane spring 50' finds its own operating position, as in the embodiment previously described. The curved arm and vane seat arrangement illustrated in Fig. 9 permit a somewhat greater range of movement of the vane spring 51' in finding its operating position than is the case in the arrangement of Figs. 1, 6 and 8. Vanes and vane springs of the arrangement of Fig. 9 have given entirely satisfactory operating results, but the curved vane seat requires a deeper cut into the radially inner end of the vane than is required for the substantially straight vane seat 18 of Fig. 8, and the arrangement of Fig. 9 is therefore usually less desirable than that of Figs. 1, 6, 7 and 8 as well as for the reason of the somewhat greater time required in assembly, although the latter is of minor importance.

Figure 10:
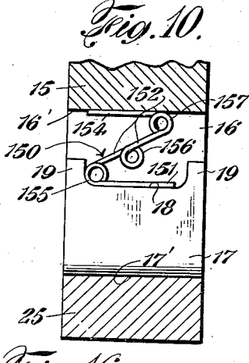
Figure 11:
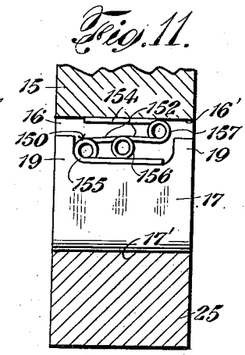

Figs. 10 and 11 illustrate another modification of the vane spring element, broadly designated by the numeral 150, which has been found practical and has proved successful. The vane spring 150 is a compound torsion type spring and comprises a pair of preferably identical arm portions 151 and 154 respectively having preferably identical coiled portions 155 and 157 respectively on one of the ends thereof. The coiled portions 155 and 157 are joined by an arm portion 152 extending between them in a generally diagonal direction and having a coiled portion 156 intermediate and preferably substantially equidistant from its ends; or, looked at from another view point, it may be said that a short arm portion 152 merges with and extends from each of the coiled portions 155 and 157 respectively with the two short arm portions 152 merging with a common intermediate connecting coiled portion 156. Each of the coiled portions 155, 156 and 157 preferably comprises a plurality of coils and said coils are also preferably arranged in substantial alinement with one another in the plane of their movement incident to flexing of the vane spring 150, as will be understood from the previous explanation of the vane spring 50 of Figs. 1, 6, 7 and 8. The proportions are also preferably such that the coiled portion 157 clears the adjacent inwardly projecting portion 19 of the corresponding vane 17 when the said vane is in its extreme radially inward position. With this arrangement the arm 151 is always parallel to the arm 154 but there is relative longitudinal movement between the arm 154, coiled portion 157 with respect to the arm 151, coiled portion 155 as the vane spring 150 deflects in unison with inward and outward movement of the vane 17. This relative longitudinal movement usually takes place adjacent the arm 154 and coiled portion 157 at the inner end 16' of the corresponding vane slot 16 and in practice it has been found that this small longitudinal movement does not result in appreciable friction or serious wear, particularly when the inner ends 16' of the vane slots 16 are smoothly finished.

The arrangement of Figs. 10 and 11 permits the vane spring 150 to be accommodated in a very small space and also permits the use of coiled portions having a diameter greater than that of the coiled portions of a vane spring of the arrangement illustrated in Figs. 1, 6, 7 and 8 for any given spacing of the recessed seat 18 from the inner end 16' of the corresponding vane slot 16. The intermediate coiled portion 156 may be omitted in some instances but its use has been found advantageous and vane springs of the general character illustrated in Figs. 10 and 11 have given entirely satisfactory results in extended operation.

Figure 12:
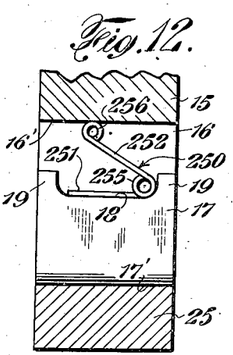
Fig. 12 is another enlarged fragmentary view, partly in section, corresponding generally to Fig. 6 but showing another modification of the vane spring.

A further modification of the vane spring element is illustrated in Fig. 12 in which the modified vane spring 250 comprises an arm portion 251 and a coiled portion 255 which are adapted to bear against the recessed seat 18 of the corresponding vane 17. The modified vane spring 250 also includes an arm portion 252 extending in a generally diagonal direction from the coiled portion 255 and having an end portion 256 adapted to slidingly bear against the inner end 16' of the corresponding vane slot 16. The end portion 256 moves back and forth in a generally longitudinal direction in contact with the inner end 16' of the vane slot 16 as the vane spring 250 flexes in unison with the inward and outward movement of its vane 17; the use of coils at said end portion 256 provides a somewhat "rolling" or rocking contact with the vane slot's inner end 16' and also increases the bearing surface when said coiled end portion 256 comprises a plurality of coils; the coiled end portion 256 is not otherwise materially active.

It will be observed that all above described modified forms of the vane spring elements comprise torsion type springs, the portions of which that are active or flexed incident to inward and outward movement of the vanes comprise solely arm portions and coiled portions, and this limited combination of active parts is essential in a successful torsion type vane spring. It will also be observed that all modifications also have other common characteristics; for example, all of them provide vane springs which are free to find their own proper operating positions, which are kept in place by cooperation of the vanes, rotor and other cooperating parts but are without attachment to any of said parts.

Figure 13:
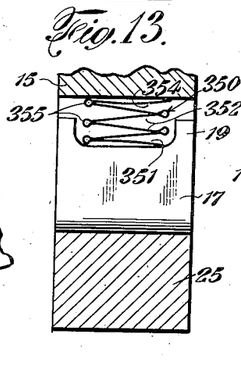
Figs. 13 and 14 correspond generally to Figs. 11 and 10 respectively but illustrate another modified form of the vane spring element.
Figure 14:
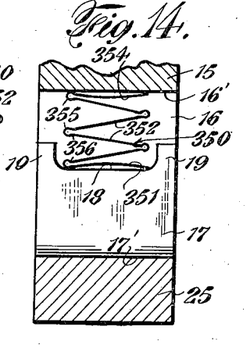

The embodiments of the vane spring element described up to this point are conveniently made from round spring wire, such, for example, as music wire, and may be formed cold, that is to say, they will give satisfactory results when formed without the application of heat and without heat treatment after forming, although it is not necessary that this practice be followed. Figs. 13 and 14 illustrate in somewhat exaggerated manner a modified vane spring 350 which is preferably but not necessarily made from flat spring wire and in which best results have been obtained by forming the vane springs with the wire heated, followed by stress relief and hardening heat treatment.

The modified vane spring 350 of Figs. 13 and 14 includes preferably identical arm portions 351 and 354 which are adapted to bear directly against the vane seat 18 and the inner end 16' of the vane slot 16 respectively. A plurality of arm portions 352, all substantially identical, are disposed intermediate the arms 351 and 354 in what may be termed a somewhat "accordion" arrangement as illustrated, with the ends of each of the arm portions 352 connected with the contiguous ends of the two arm portions adjacent thereto by "hair pin" bends or curved portions 355 having a relatively small radius of curvature.

An important feature of this arrangement is the means by which deflection and stress at the curved portions 355 is limited. This is accomplished by continuing the curvature of these portions 355 to form slightly less than a complete circle, oval, etc., as indicated at 356 in Fig. 14, with the "open" ends thereof (i. e., the ends of the curved portions 355 which join the arm portions) separated by a small distance when the vane spring is not fully compressed, as indicated in Fig. 14. With this arrangement the "open" ends of the curved portions 355 come into contact with one another as the vane spring 350 is compressed and the arrangement is preferably such that such contact takes place when the vane spring 350 has been compressed to an extent intermediate the maximum and minimum compression thereof; this will be understood from Fig. 13 which shows the "open" ends of the curved portions 355 in contact with one another. The flexing of the curved portions 355 is thus definitely limited, so that only a predetermined deflection thereof takes place, with consequent limitation of the stress induced therein. This is the preferred arrangement, but may be varied, as, for example, by forming the curved portions 355 so that the ends thereof which have been described as "open" are always in contact with one another. This feature, as previously stated, is of great importance in a vane spring of this character.

A large part (and probably the greater part) of the deflection of the vane spring 350 takes place in the arm portions thereof and particularly in the intermediate arm portions 352, each of which bends slightly intermediate its ends as the vane spring 350 is deflected. The amount of this bending in each of said arm portions is relatively small, however, and there is a correspondingly small change in the shape thereof, but it will be understood that such bending and change in shape does take place notwithstanding that the arm portions have been shown as of substantially the same shape in both Figs. 13 and 14. In a vane type motor of the general proportions and stroke herein illustrated the space available to accommodate each modified vane spring 350 and the operating properties required of it are such that it is necessary that said modified vane spring 350 have a relatively large number of arm portions. The modified vane spring 350 readily lends itself to the use of such a relatively large number of arm portions and while six such arm portions are illustrated in Figs. 13 and 14, it is frequently possible to use a larger number (such as nine or ten) in a modified vane spring 350 requiring no more space than is required, for example, for a vane spring 50 capable of providing usable deflection through the same range of vane movement or stroke.

The modified vane spring 350 of Figs. 13 and 14 has substantially all of the advantages previously stated in connection with the vane spring 50. For example, there is substantially no movement of the arm portions 351 and 354 in an axial or longitudinal direction at their contacts with the seat 18 and inner end 16' of the vane slot 16. Similarly, substantially no axially end-wise thrust is exerted on the vane as the corresponding vane spring 350 is deflected, that is to say, the vane spring 350 does not tend to force the vane 17 against one or the other of the cheek plates 34 or 35 to any important extent. It is assembled with its corresponding vane 17 in the same manner as explained in connection with the vane spring 50 and likewise finds and maintains its proper operating position without attachment to the vane, the rotor or any other part of the fluid pressure device. It also has the advantage that any wear due to rubbing against the opposing side walls of the vane slot does not appreciably affect its strength or life, particularly when made from flat spring wire; this is one of the reasons why the use of flat spring wire is preferred, another reason being that flat wire tends to give the modified vane spring 350 greater internal stability with less tendency for the arm portions to move or deflect out of alinement with each other in their plane of deflection than is the case when round wire is used. Vane springs of the character illustrated in Figs. 13 and 14 have proved entirely satisfactory in practice and this success is believed to be due in large measure to the means by which the deflection at the curved portions 355 is limited.

It will be observed that in all embodiments of the vane spring element illustrated and described herein, each of them is formed from a single continuous piece of material; each of them is disposed entirely within the corresponding vane slot; each of them has a portion adapted to bear directly against the inner end of the vane slot and another portion adapted to bear directly against the inner end of the vane; each of them has a plurality of portions resiliently disposed intermediate the portions which bear against the inner end of the vane and of the vane slot respectively; each of them is loosely mounted, that is to say, is without attachment to the vane, the rotor or any other part of the fluid pressure device; each of them is free to find and maintain its proper operating position and to adjust its position as occasion may require; and each of them is maintained in operating position within the vane slot by cooperation of the inner end of the vane slot, the recessed seat at the inner end of the vane and the portions of the vane projecting radially inward beyond the recessed seat, permitting but limiting the previously mentioned self-locating or adjusting movement of the vane spring, with the vanes kept substantially in alinement with the rotor by the cheek plates.

Figures 15, 16:
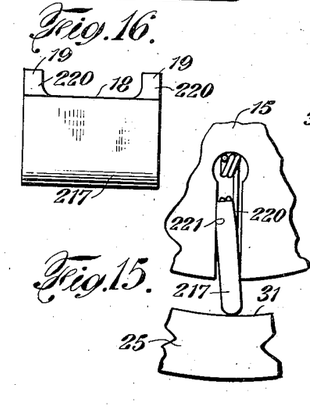
Fig. 15 is an enlarged fragmentary view showing a portion of the side or face of the rotor and a portion of the vane track together with an end view of another modified form of the vane.
Fig. 16 shows one face of the modified vane shown in Fig. 15.

The arrangement may also be modified in other ways; for example, the vane elements may be modified as illustrated in exaggerated manner in Figs. 15 and 16. Referring to these figures, each vane tends to tilt in its vane slot as the outer end thereof traverses the working arcs 31 and sealing arcs 27, this tilting being due in part to the difference in pressures on the opposite faces of the outer end of the vane. The amount of this tilting is determined by several factors, such, for example, as the length of the vane, the distance that the vane protrudes radially beyond the periphery of the rotor and the clearance between the opposing wall surfaces of the vane slots 16 and the faces of the vane. The tilted vane approximates a lever which imposes a load on the inner end of the vane, and this load could be concentrated and imposed solely on the tips or inner ends of the inwardly projecting portions 19 of the embodiments of the vane elements previously described if the vane should be sufficiently tilted; the latter could cause increased wear and breakage and also leakage of the working pressure fluid from the inner ends of the vane slots, particularly during the time that the outer ends of the vanes are traversing the working arcs 31 and sealing arcs 27. In order to prevent breakage or damage due to increased wear, etc. by this cause, the faces of the modified vane 217 are relieved at their inner ends adjacent and including the inwardly projecting portions 19, as indicated at 220 in Figs. 15 and 16. This relief is preferably made such that the load at the inner end of the vane can not be imposed solely on the inwardly projecting portions 19 but is imposed on the entire width of the vane. In the preferred embodiment illustrated, this relief is provided by tapering or beveling the faces of the inwardly projecting portions 19 so that, with the vane fully tilted as its outer end traverses the working arc 31, one face of each of said inwardly projecting portions 19 is flat against the wall surface of the vane slot 16, as indicated at 221 in Fig. 15, while at the same time there is contact between the wall of the vane slot and the full width of the vane at a point substantially in line with (but not radially inward with respect to) the recessed seat 18. This arrangement distributes the load across the full width of the vane and the faces of the inwardly projecting portions 19 as the outer end of the vane traverses the working arcs 31 and thus prevents damage or breakage. The load is not so fully distributed when the outer end of the vane traverses the sealing arcs 27 but no damage or breakage will result because the tilting of the vane is less than at the working arcs 31 and the force imposed on the inner end of the vane is relatively small due to the very small protrusion of the vane beyond the rotor 15 and the correspondingly small load on the outer end of the vane.

While described as a vane type fluid motor, the fluid pressure device of the present invention may also be employed for other purposes; for example, it will also function as a vane type pump. For example, the embodiment illustrated in Figs. 1, 2, 3, 4 and 6 will function as a pump if the shaft 20 is driven in a clockwise direction as viewed in Fig. 2 and the channel 43 is connected with a fluid supply; pressure fluid will then be delivered into the ports 36, channel 42, etc. Use of the modified arrangement shown in Fig. 5 will provide a vane type pump capable of operation in either direction of rotation of its rotor 15 and shaft 20; pressure fluid will be delivered into the ports 36 and channel 42 when the shaft and rotor are driven in a clockwise direction as viewed in Fig. 2 and into the ports 37 and channel 43 when said rotor and shaft are driven in a counterclockwise direction. In either arrangement any form of the vane springs illustrated herein may be employed. In both arrangements the pump will provide satisfactory operation at low speeds as well as relatively high speeds such as 1200 R. P. M. or higher and at working pressures up to and including 1,000 lbs. per sq. in. or more, and is particularly suited for use as an hydraulic device with a substantially incompressible liquid, such, for example, as oil, as the circulated fluid. The term "fluid pressure device" as used in the appended claims is therefore intended to include both pumps and fluid motors as well as all other forms of fluid pressure devices to which the invention is applicable.

It is to be understood that the foregoing is merely an exemplifying disclosure and that changes, some of which have been indicated, may be made in the apparatus without departing from the applicant's invention as defined in the appended claims.

We claim:

1. In a rotary vane type hydraulic pressure device for use with a substantially incompressible liquid as the circulated fluid, a rotor provided with a plurality of vane slots each having an inner end wall element, a vane element in each slot arranged for inward and outward movement with respect to the rotor, each inner end wall element and the vane element in the corresponding slot comprising a pair of elements, a vane track arranged to contact the outer ends of said vane elements to guide and control them in their inward and outward movement, a high pressure inlet area positioned adjacent said vane track and said rotor whereby the outer ends of the vane elements are subject to the pressure therein while passing therethrough, means for substantially balancing hydraulic forces acting on each vane element in the direction of its inward and outward movement throughout the time that the outer end thereof is passing through the high pressure inlet area, a separate multi-arm spring disposed in the bottom of each of said slots intermediate the end wall and vane elements thereof for moving said vane element outward to maintain its outer end in contact with the vane track as said outer end moves through said high pressure inlet area, each of said springs being formed of a single continuous piece of spring metal with each arm disposed in a generally angular relation to the arm contiguous thereto and having at least one portion curved about an axis non-parallel with respect to the direction of inward and outward movement of the vane element in said slot, one arm of said spring unattachedly and continuously bearing against one of said elements and another arm unattachedly and continuously bearing against the other of said elements, and means carried by at least one element of each pair of elements for maintaining the corresponding spring in operating position while permitting but limiting self-locating movement thereof in a direction substantially parallel to the axis of the rotor.

2. In a rotary vane type fluid pressure device having a rotor provided with a plurality of vane slots extending through the entire axial length of said rotor, each slot having an inner end wall element, a vane element in each slot arranged for movement inward and outward with respect to the rotor, each inner end wall element and the vane element in the corresponding slot comprising a pair of elements, a vane track adapted to contact the outer ends of said vane elements to guide and control them in their inward and outward movement, and a fluid inlet area disposed adjacent said vane track and the rotor whereby the outer ends of the vane elements are subject to the pressure of the fluid in said inlet area while passing therethrough, the combination of means substantially balancing the hydraulic forces acting in an axial direction on said vane elements, means for maintaining at the inner ends of said vane elements fluid pressure at least substantially equal to the pressure of the fluid simultaneously acting on the outer ends thereof while said outer ends are passing through the inlet area, a single spring disposed in the inner end of each of said slots for moving the vane element thereof outward to maintain the end thereof in contact with said vane track as the outer end of the vane element moves through said inlet area, each of said springs being formed of a single continuous piece of spring metal having end arm portions loosely engaging respectively the inner end wall element of the slot and the inner end of the vane element, at least one of said end portions extending generally in an axial direction, and means carried by at least one of the elements of the corresponding pair of elements for maintaining each of said springs in operating position in its slot.

3. In a rotary vane type fluid pressure device having a rotor provided with a plurality of vane slots, a vane in each slot arranged for inward and outward movement with respect to the rotor, a casing including a vane track adapted to contact the outer ends of said vanes and to guide and control said vanes in their inward and outward movement and provided with a working chamber and a sealing chamber, each of said chambers extending for an arcuate distance substantially equal to the arcuate distance between two adjacent vanes and each of said chambers having high and low pressure areas on opposite circumferential sides thereof adjacent the rotor, the outer ends of said vanes being subject to the respective pressures in said chambers and in said areas while passing therethrough, means at least in part external to said rotor and said vanes for maintaining at the inner ends of the vanes fluid pressure substantially equal to the pressure in said high pressure area during at least the time that said vanes are passing through said high pressure area, said working chamber and said sealing chamber, spring means for moving said vanes outward to keep the ends thereof in contact with said vane track comprising a separate torsion type spring for each vane the parts of which that are active incident to deflection of the spring as the vane moves inward and outward consisting solely of arm portions and coiled portions, each coiled portion comprising at least a full coil and each spring being entirely and loosely disposed within its corresponding vane slot, and retaining means carried by each vane for maintaining the corresponding spring in operating position in its slot.

4. In a rotary vane type fluid pressure device having a rotor provided with a plurality of vane slots, each slot having an inner end wall element, a vane element in each slot arranged for inward and outward movement with respect to the rotor, each inner end wall element and the vane element in the corresponding slot comprising a pair of elements, a vane track adapted to contact the outer ends of said vane elements and to guide and control said vane elements in their inward and outward movement, a fluid inlet area and a fluid outlet area, said areas being positioned adjacent said vane track and said rotor whereby the outer ends of said vane elements are subject to the respective pressures therein while passing therethrough, the combination of means for substantially equalizing the pressure of the fluid simultaneously acting on the inner and outer ends of said vane elements while the outer ends thereof are passing through said inlet area and throughout the time that the outer ends thereof are passing through said outlet area, spring means for moving said vane elements outward to keep the outer ends thereof in contact with said vane track as they pass through said inlet area, comprising a separate vane spring for each vane element arranged to simultaneously and continuously react against the inner end of said vane element and the inner end wall element of the corresponding vane slot and having a coiled portion adapted to continuously bear against one of said elements with arm portions merging therewith and extending therefrom, one of said arm portions having a substantially unchanging positional relation with respect to said coiled portion as the vane spring flexes in unison with inward and outward movement of the corresponding vane element, said coiled portion being curved about an axis non-parallel with respect to the direction of inward and outward movement of the vane element in said slot, and means carried by at least one element of each pair for maintaining the corresponding vane spring in operating position in its slot.

5. In a rotary vane type fluid pressure device for use with a substantially incompressible liquid as the circulated fluid and having a rotor provided with a plurality of vane slots, a vane in each slot arranged for inward and outward movement with respect to the rotor, a casing having a vane track adapted to contact the outer ends of said vanes and to guide and control said vanes in their inward and outward movement and provided with two diametrically opposed sealing chambers and two diametrically opposed working chambers each having high pressure and low pressure chambers on opposite circumferential sides thereof adjacent the rotor, said sealing and working chambers each extending for an arcuate distance at least substantially equal to the arcuate distance between two adjacent vanes, the outer ends of the vanes being subject to the respective pressures in said chambers while passing therethrough, a first group of vane slot ports for admitting fluid from said high pressure chambers to the inner ends of the vanes during the time that the outer ends of said vanes are passing through said high pressure, working and sealing chambers, a second group of vane slot ports for connecting the inner ends of said vanes with said low pressure chambers during the time that the outer ends of said vanes are passing through said low pressure chambers, spring means for moving said vanes outward to keep the ends thereof in contact with said vane track comprising a separate vane spring for each vane arranged to simultaneously and continuously react against the inner end of said vane and the inner end of the corresponding vane slot and having a curved portion arranged to continuously bear against the inner end of said vane with arm portions merging therewith and extending therefrom, said curved portion being curved about an axis non-parallel with the direction of inward and outward movement of the vane in its slot, and means disposed within each slot for maintaining the corresponding vane spring in operating position and substantially free from localized stresses therein as said vane spring is flexed.

6. In a rotary vane type fluid pressure device having a rotor provided with a plurality of vane slots extending through the entire axial length of said rotor, a vane in each slot arranged for inward and outward movement with respect to the rotor, a vane track adapted to contact the outer ends of said vanes and to guide and control said vanes in their inward and outward movement, a fluid inlet area positioned adjacent said vane track and said rotor whereby the outer ends of said vanes are subject to the pressure therein while passing therethrough, the combination of means for substantially equalizing the pressure of the fluid simultaneously acting on the inner and outer ends of said vanes while the outer ends thereof are passing through said inlet area, spring means for moving said vanes outward to keep the outer ends thereof in contact with said vane track as they pass through said inlet area comprising a separate vane spring for each vane, each vane spring having a coiled portion arranged to continuously bear against the inner end of said vane, arm portions merging with and extending from said coiled portion, another coiled portion arranged to continuously bear against the inner end of the corresponding vane slot and arm portions merging with and extending from said last named coiled portion, and retaining means for each vane spring disposed within the corresponding vane slot and arranged to keep the corresponding vane spring entirely within its vane slot while permitting freedom of positioning adjustment of said vane spring such that it finds and maintains its proper operating position.

7. In a rotary vane type fluid pressure device having a rotor provided with a plurality of vane slots, a vane in each slot arranged for inward and outward movement with respect to the rotor, a vane track adapted to contact the outer ends of said vanes and to guide and control said vanes in their inward and outward movement, means for maintaining at the inner ends of said vanes fluid pressure at least substantially equal to the pressure of the fluid simultaneously acting on the outer ends thereof while said vanes are moving outward, spring means for moving said vanes outward to keep the ends thereof in contact with said vane track comprising a separate compound torsion-type vane spring for each vane, each vane spring having a first arm portion extending in a generally longitudinal direction with respect to the rotor and merging at one end thereof with a first coiled portion, said first arm and first coiled portions being arranged to continuously contact the inner end of the corresponding vane, a second arm portion extending in a generally longitudinal direction with respect to the rotor and merging at one end thereof with a second coiled portion, said second arm and second coiled portions being arranged to continuously contact the inner end of the corresponding vane slot, a plurality of intermediate arm portions disposed between said first and second coiled portions and an intermediate coiled portion merging with the adjacent ends of each pair of contiguous intermediate arm portions, and means disposed within each vane slot for maintaining the vane spring therein in operating position while permitting limited self-adjusting movement thereof.

8. In a rotary vane type fluid pressure device for use with a substantially incompressible liquid as the circulated fluid and having a rotor provided with a plurality of vane slots, a vane in each slot arranged for inward and outward movement with respect to the rotor, a vane track adapted to contact the outer ends of said vanes and to guide and control said vanes in their inward and outward movement, a fluid inlet area positioned adjacent said vane track and said rotor whereby the outer ends of said vanes are subject to the pressure therein while passing therethrough, means for substantially equalizing the pressure of the fluid simultaneously acting on the inner and outer ends of said vanes while the outer ends thereof are passing through said inlet area, spring means for moving said vanes outward to keep the outer ends thereof in contact with said vane track as they pass through said inlet area comprising a separate compound torsion-type vane spring for each vane, each vane spring having a first arm portion extending in a generally longitudinal direction with respect to the rotor and merging at one end thereof with a first coiled portion, said first arm and first coiled portions being arranged to continuously bear against the inner end of the corresponding vane, a second arm portion extending in a generally longitudinal direction with respect to the rotor and merging at one end thereof with a second coiled portion, said second arm and second coiled portions being arranged to continuously bear against the inner end of the corresponding vane slot, said first and second coiled portions being positioned at the same longitudinal end of the rotor, a pair of intermediate arm portions projecting one from each of said first and second coiled portions respectively and extending in angular relation toward each other and an intermediate coiled portion merging with said intermediate arm portions at their converging ends, and means carried by each vane for maintaining the corresponding vane spring in operating position.

9. In a rotary vane type fluid pressure device having a rotor provided with a plurality of vane slots, a vane in each slot arranged for inward and outward movement with respect to the rotor, a vane track adapted to contact the outer ends of said vanes and to guide and control said vanes in their inward and outward movement, means for maintaining at the inner ends of said vanes fluid pressure at least substantially equal to the pressure of the fluid simultaneously acting on the outer ends thereof while said vanes are moving outward, spring means for moving said vanes outward to keep the ends thereof in contact with said vane track comprising a separate compound torsion-type vane spring for each vane, each vane spring having a pair of substantially parallel arm portions extending in a generally longitudinal direction with respect to the rotor, one of said arm portions being arranged to continuously contact the inner end of the corresponding vane and the other being arranged to continuously contact the inner end of the corresponding vane slot, a pair of coiled portions, one on an end of each of said parallel arm portions, one of said coiled portions being arranged to continuously contact the inner end of the vane and the other to continuously contact the inner end of the vane slot, a pair of intermediate arm portions, one projecting from each of said coiled portions, said intermediate arm portions converging toward each other, and an intermediate coiled portion merging with said intermediate coiled portions at their converging ends, and means disposed within each vane slot for maintaining the corresponding vane spring in operating position without definite attachment to any part of the device.

10. In a rotary vane type fluid pressure device having a rotor provided with a plurality of vane slots, a vane in each slot arranged for inward and outward movement with respect to the rotor, a vane track adapted to contact the outer ends of said vanes and to guide and control said vanes in their inward and outward movement, means for maintaining at the inner ends of said vanes fluid pressure at least substantially equal to the pressure of the fluid simultaneously acting on the outer ends thereof while said vanes are moving outward, spring means for moving said vanes outward to keep the ends thereof in contact with said vane track comprising a torsion-type vane spring for each vane, each vane spring having an arm portion disposed adjacent the inner end of the corresponding vane and extending in a generally longitudinal direction with respect to the rotor, a coiled portion having a plurality of coils merging with said arm portion, said arm portion and said coiled portion having a substantially unchanging positional relation with respect to the inner end of the vane and with respect to each other as the vane spring flexes in unison with inward and outward movement of the corresponding vane, and a second arm portion projecting in a generally diagonal direction from said coiled portion and having an end portion arranged to continuously contact and slidingly bear against the inner end of the corresponding vane slot, and means disposed in each of said vane slots for maintaining the corresponding vane spring therein in operating position and arranged to permit but limit self-adjusting movement of said vane spring.

11. In a rotary vane type fluid pressure device for use with a substantially incompressible liquid as the circulated fluid and having a rotor having a plurality of vane slots with end wall elements, a vane element in each of said vane slots arranged for inward and outward movement with respect to the rotor, and a vane track adapted to contact the outer ends of said vane elements and to guide and control said vane elements in their inward and outward movement, the combination of means for maintaining at the inner ends of said vane elements fluid pressure at least substantially equal to the pressure of the fluid simultaneously acting on the outer ends thereof while said vane elements are moving outward, spring means for moving said vane elements outward to keep the outer ends thereof in contact with said vane track comprising a separate torsion type vane spring for each vane element disposed intermediate the corresponding vane element and the corresponding end wall element, each of said vane springs comprising a coiled portion adapted to continuously contact one of said elements, said coiled portion having a plurality of coils, and said vane spring element also comprising a pair of arm portions merging with and projecting from said coiled portion, at least one of said arm portions extending toward the other of said elements and having an end portion arranged to continuously bear against said last named element in sliding relation therewith, and retaining means for each vane spring carried by at least one of the elements continuously contacted thereby and arranged to keep the corresponding vane spring within its slot while permitting freedom of positioning adjustment of said vane spring such that it finds and maintains its proper operating position.

12. In a rotary vane type fluid pressure device, a rotor having a plurality of vane slots each having an end wall element, a vane element in each slot arranged for inward and outward movement with respect to the rotor, each inner end wall element and the vane element in the corresponding vane slot comprising a pair of elements, a vane track arranged to contact the outer ends of said vane elements to guide and control them in their inward and outward movement, an inlet area positioned adjacent the vane track and the rotor whereby the outer ends of the vane elements are subject to the pressure therein while passing therethrough, spring means for moving said vane elements outward as the outer ends thereof pass through said inlet area to keep said outer ends in contact with said vane track comprising a separate vane spring for each vane element disposed at the inner end of the corresponding vane slot intermediate the end wall element and vane element thereof, each vane spring comprising a plurality of arm portions and a plurality of curved portions disposed intermediate said arm portions including an arm portion merging at one of its ends with a curved portion, said last named arm portion and said last named curved portion continuously bearing against one of said elements, each of said arm portions being disposed in a generally angular relation with respect to the arm portions contiguous thereto, and means carried by at least one of the elements of each pair of elements for maintaining the corresponding vane spring in operating position in its vane slot while permitting limited self-adjusting movement thereof.

13. In a rotary vane type fluid pressure device for use with a substantially incompressible liquid as the circulated fluid and having a rotor provided with a plurality of vane slots, a vane in each slot arranged for inward and outward movement with respect to the rotor, a vane track adapted to contact the outer ends of said vanes and to guide and control said vanes in their inward and outward movement, spring means for moving said vanes outward to keep the ends thereof in contact with said vane track comprising a separate vane spring for each vane, each vane spring comprising a plurality of arm portions, means connecting said arm portions one to the other, including means limiting the deflection of said connecting means, and means disposed within each vane slot for maintaining the vane spring therein in operating position.

14. In a rotary vane type fluid pressure device having a rotor provided with a plurality of vane slots, each vane slot having an inner end wall element, a vane element in each slot arranged for inward and outward movement with respect to the rotor, each inner end wall element and the vane element in the corresponding vane slot comprising a pair of elements, a vane track adapted to contact the outer ends of said vane elements and to guide and control said vane elements in their inward and outward movement, a fluid inlet area positioned adjacent said vane track and said rotor whereby the outer ends of said vane elements are subject to the pressure therein while passing therethrough, means for maintaining at the inner ends of said vane elements fluid pressure at least substantially equal to the pressure of the fluid acting on the outer ends of said vane elements while the outer ends thereof are passing through said inlet area, spring means for moving said vane elements outward to keep the outer ends thereof in contact with said vane track as they pass through said inlet area comprising a separate vane spring for each vane element, each vane spring comprising a plurality of arm portions disposed in a generally accordian arrangement with curved portions connecting said arm portions including means for limiting the deflection of said curved portions, said last named means comprising the ends of said curved portions arranged to come into contact with one another upon predetermined deflection of said curved portions, and means carried by at least one of the elements of each pair of elements for maintaining the corresponding vane spring in substantially self-located operating position.

15. In a rotary vane type fluid pressure device having a rotor provided with a plurality of vane slots, a vane in each slot arranged for inward and outward movement with respect to the rotor, a vane track adapted to contact the outer ends of said vanes and to guide and control said vanes in their inward and outward movement, and a fluid inlet area disposed adjacent said vane track and said rotor, the combination of spring means for moving said vanes outward to keep the outer ends thereof in contact with said vane track comprising a separate vane spring for each vane, each vane spring having a pair of substantially parallel arm portions arranged to unattachedly bear against the inner end of the vane slot and of the vane respectively and also having a plurality of intermediate arm portions disposed intermediate said first named arm portions with each end of each intermediate arm portion connected with the contiguous end of one of the adjacent arm portions by a curved portion, including means for limiting the deflection of said curved portions, and means disposed within each vane slot for maintaining the corresponding vane spring therein in operating position.

16. In a rotary vane type fluid pressure device, a rotor having a plurality of vane slots each provided with side walls, a vane arranged to move inward and outward in each slot and to tilt between the wall surfaces thereof during at least a portion of each rotation of the rotor, said vane having a recessed seat at its inner end with portions of said vane projecting inward beyond said seat, the inner end of said vane being reduced in thickness to provide, in the tilted position of said vane, contact with one of said side walls across the full width of the vane at a point at least as near the outer end of the vane as the distance from said outer end to said seat, a vane track adapted to contact the outer ends of said vanes and to guide and control said vanes in their inward and outward movement, and spring means for moving said vanes outward to keep the ends thereof in contact with said vane track comprising a separate vane spring for each vane, each vane spring unattachedly engaging the seat of the corresponding vane and being disposed intermediate said inwardly projecting portions of said vane, said seat and said inwardly projecting portions of said vane maintaining said vane spring in substantially self-located operating position.

17. In a rotary vane type fluid pressure device, a rotor having a diameter exceeding its width and provided with a plurality of substantially radial vane slots, each vane slot extending from the periphery of the rotor to a point intermediate the center thereof, a vane in each slot arranged for inward and outward movement in a substantially radial direction with respect to the rotor, a vane track adapted to contact the outer ends of said vanes and provided with a working chamber having inlet and outlet areas on opposite circumferential sides thereof adjacent the rotor, the outer ends of said vanes being subject to the respective pressures in said chamber and said areas while passing therethrough, a pair of guide plates disposed on opposite axial sides of said rotor and arranged to guidingly maintain said vanes substantially in alinement with said rotor as they move inward and outward, mating ports in said guide plates arranged to substantially balance hydraulic forces acting in an axial direction on said vanes and said rotor, said ports including inlet and outlet ports connected with said inlet and outlet areas respectively, means for maintaining at the inner ends of said vanes fluid pressure at least substantially equal to the pressure of the fluid simultaneously acting on the outer ends thereof during the time that said outer ends are passing through the inlet area, spring means for moving said vanes radially outward to keep the ends thereof in contact with said vane track as the outer ends of said vanes move through said inlet area, said spring means including a separate vane spring for each vane formed from a single continuous piece of material and having a plurality of portions comprising a first portion adapted to unattachedly bear directly against the inner end of the corresponding vane slot, a second portion adapted to unattachedly bear directly against the inner end of the corresponding vane and at least one portion resiliently disposed intermediate said first and second named portions, each vane spring being disposed entirely within its corresponding vane slot, and means for maintaining said vane springs in substantially self-located operating position in said vane slots but without contact with said guide plates.

18. In a fluid pressure device of the rotary vane type, a rotor having vane slots and vanes disposed therein and adapted to follow a vane track, a spring in each of said slots for assisting in holding the vane in contact with the track, each of said springs comprising two or more elongated spring arms disposed generally in an axial direction relative to the rotor with adjacent arms merging into rounded parts curved about an axis non-parallel with the direction of movement of said vane in the corresponding vane slot, the inner end of each of the vanes and the inner end of each of the corresponding slots forming seats for the springs with one of said seats being provided with an elongated recess disposed centrally thereof for receiving an elongated arm of a spring and stabilizing and centering the same, and both said vanes and said inner ends of said slots being wholly unattached to the springs to prevent the inducing of any substantial local stresses therein upon flexing of the same.

19. In a rotary vane type fluid pressure device having a vane track, a rotor provided with a plurality of slots and a vane in each of said slots movable inward and outward therein, each of said slots having side wall elements and an inner end element and each of said vanes having an inner end element, the combination of means for assisting in holding said vanes in contact with said vane track comprising a spring disposed in each of said slots, each of said springs being formed of a single piece of spring metal and having arm portions arranged to contact the inner end element of the corresponding slot and the inner end element of the corresponding vane respectively and also having at least one portion curved about an axis non-parallel with respect to the direction of movement of the vane in said slot and arranged to continuously contact one of said elements, at least one of said arm portions being arranged to provide and of sufficient length to form a stabilizing support for the spring, both the inner end element of said slot and the inner end element of said vane being unattached to said spring, and means for maintaining each of said springs in operating position with the contact of said spring limited to contact with the elements of the corresponding slot and vane but without attachment to any of said elements.

20. In a rotary vane type fluid pressure device having a rotary assembly comprising a rotor provided with a plurality of vane slots with vanes therein movable inward and outward with respect to the rotor in a substantially radial direction, and a vane track adapted to contact the outer ends of said vanes to guide and control the vanes in their inward and outward movement and acting to move said vanes radially inward during a portion of their rotary travel in unison with the rotor, the combination of means for assisting in holding said vanes in contact with said track comprising a spring disposed in each of said slots and arranged to urge the corresponding vane radially outward, said spring bearing against the inner end of said vane and against the inner end of said slot but without attachment to any part of said device, each of said springs comprising at least two arm portions with one of said arm portions arranged to occupy positions of changing angularity with respect to the first named arm portion as said spring is flexed in unison with inward and outward movement of the corresponding vane, said spring also comprising a curved portion disposed intermediate and connecting the contiguous ends of said first and second named arm portions, and means for maintaining each of said springs in operating position with said spring contacting only the side walls and inner end of its slot and the inner end of the corresponding vane, including a seat recessed in the inner end of each vane and having a side portion of the vane disposed at each end thereof and extending radially inward therefrom, said seat engaging said curved portion and said first named arm portion in substantially unchanging contact relation therewith during operation of the device.

21. In a rotary vane type fluid pressure device for use with a substantially incompressible liquid as the circulated fluid and having a rotor provided with a plurality of vane slots, each vane slot having an inner end wall element, a vane element in each vane slot arranged for inward and outward movement with respect to the rotor, each inner end wall element and the vane element in the corresponding vane slot comprising a pair of elements, a vane track adapted to contact the outer ends of said vane elements and to guide and control said vane elements in their inward and outward movement, a spring in each of said vane slots for assisting in holding the vane therein in contact with said vane track, each of said springs having at least two arm portions and at least one portion curved about an axis non-parallel with the direction of inward and outward movement of the corresponding vane, one of said arm portions and said curved portion bearing against one of the elements of the corresponding pair of elements in substantially unchanging contact relation therewith and in substantially unchanging positional relation of said last named arm portion with respect to said curved portion, and means disposed within each vane slot for maintaining the corresponding spring in operating position in its vane slot.

22. In a reversible rotary vane type fluid pressure device having a rotor provided with a plurality of vane slots, vanes in said slots movable inward and outward therein with respect to the rotor, a casing including a vane track adapted to contact the outer ends of the vanes and provided with a working chamber and a sealing chamber adjacent the rotor, each of said chambers extending in a circumferential direction for an arcuate distance substantially equal to the arcuate distance between two adjacent vanes and each of said chambers having interchangeable high and low pressure areas on opposite circumferential sides thereof adjacent the rotor, the outer ends of the vanes being subject to the respective pressures in said chambers and areas while passing therethrough, a pair of vane slot ports arranged to connect with the inner ends of the vane slots during the time that the outer ends of the corresponding vanes are passing through said areas respectively, fluid connections between said areas and said vane slot ports respectively, whereby fluid pressures acting on the inner and outer ends of said vanes are substantially equalized during the time that the outer ends of said vanes are passing through said areas, a third vane slot port arranged to connect with the inner end of the vane slots during the time that the outer ends of the corresponding vanes are passing through the working chamber, a fourth vane slot port arranged to connect with the inner ends of the vanes during the time that the outer ends of the corresponding vanes are passing through the sealing chamber, means for supplying to said third and fourth vane slot ports fluid having substantially the same pressure as the pressure in the high pressure area irrespective of whichever of the areas is at the time the high pressure area and irrespective of interchange of relatively high and low pressures in said areas respectively, spring means for moving said vanes outward to keep the outer ends thereof in contact with the vane track comprising a separate vane spring for each vane arranged to simultaneously and continuously react against the inner end of said vane and the inner end of the corresponding vane slot and having a portion curved about an axis nonparallel with the direction of inward and outward movement of the vane in its slot, said curved portion being arranged to continuously bear against the inner end of said vane with arm portions merging therewith and extending therefrom, and means disposed within each vane slot for maintaining the corresponding vane spring in operating position while permitting limited self-adjusting movement thereof.

23. In a fluid pressure device of the rotary vane type, a rotor having vane slots and vanes disposed therein and adapted to follow a vane track, a spring in each of said slots for assisting in holding the vane in contact with the track, each of said springs being of the torsion type and having four arms disposed generally in an axial direction relative to the rotor with adjacent arms merging into torsion coils, the inner end of each of the vanes and the inner end of each of the corresponding slots forming seats for the outermost and innermost arms, one of said seats being provided with an elongated recess disposed centrally thereof for receiving an elongated arm of a spring and stabilizing and centering the same and both said vanes and said inner ends of said slots being wholly unattached to the springs with the latter loosely engaging the inner ends of the slots and the vanes.

24. In a fluid pressure device of the rotary vane type, a rotor having vane slots and vanes disposed therein and adapted to follow a vane track, a spring in each of said slots for assisting in holding the vane in contact with the track, each of said springs consisting of two elongated spring arms disposed generally in an axial direction relative to the rotor with the two arms merging into a torsion coil, the inner end of each of the vanes and the inner end of each of the corresponding slots forming seats for the springs with one of said seats being provided with an elongated recess disposed centrally thereof for receiving an elongated arm of its corresponding spring and stabilizing and centering the same and both said vanes and said inner ends of said slots being wholly unattached to the springs with the latter loosely engaging the inner ends of the slots and the vanes.

CHARLES M. KENDRICK.
HENRY STEEN.